Patented Apr. 7, 1942

2,278,605

UNITED STATES PATENT OFFICE 2,278,605

METHOD OF MANUFACTURING HYDROGEN PEROXIDE

Gustav Adolph, Solln, Germany, and Max E. Bretschger, Buffalo, N. Y., assignors to Buffalo Electro-Chemical Company, Inc., Buffalo, N. Y.

No Drawing. Application May 14, 1937, Serial No. 142,671

5 Claims. (Cl. 23—207)

This invention relates to the production of hydrogen peroxide and particularly to the recovery of hydrogen peroxide from persulfuric acid or solutions of persulfates acidified with sulfuric acid.

The production of hydrogen peroxide from persulfuric acid or solutions of persulfates acidified with sulfuric acid has been effected heretofore by distilling the acid solution in pipes arranged either vertically or horizontally, the pipes being heated either internally or externally. In the prior procedures relatively dilute solutions of persulfuric acid or solutions of persulfates acidified with sulfuric acid were caused to enter at one end of the distilling tubes or pipes and were discharged from the other end of the tubes only after a high concentration of sulfuric acid had been obtained. Of the available oxygen in the solution, a part has escaped with the vapors formed as hydrogen peroxide, while another part remains in the discharged solution as persulfuric acid, Caro's acid or unvaporized hydrogen peroxide. Further distillation and concentration has been found of no avil as Caro's acid builds up in the solution and little hydrogen peroxide is produced. It has been necessary therefore, to dilute the discharged concentrated solution and again distill.

In the prior procedures, therefore, the first phase of the concentrating and distilling operation is the elimination of water from the aqueous persulfuric acid or persulfate acidified with sulfuric acid until about 50 to 60% of volume of the entering liquid has been converted to vapor and a concentration of sulfuric acid reached where conversion of persulfates to hydrogen peroxide is effected by hydrolysis. The next phase of the prior procedures is the hydrolysis or conversion of the persulfates to hydrogen peroxide and the last phase is the reverse reaction with a decrease in the formation of hydrogen peroxide and formation of Caro's acid in the liquid component in the tubes. In these prior procedures with one passage of the solution through the tubes, it is possible, depending upon the length of the tubes, the heating area, and the vacuum employed to obtain about 45–50% of the available oxygen as hydrogen peroxide. The remainder of the available oxygen is obtained only by diluting with water and redistilling and repeating as many times as economical practice dictates.

The disadvantages of the prior procedure are that although water has been first distilled from the solution, water must be again added in order to produce conditions where recovery of further hydrogen peroxide by distillation is possible by repeated operations in order to obtain even so high a yield as about 80% of the available oxygen. A further disadvantage is that the prior method of procedure does not allow one to obtain a high concentrate of hydrogen peroxide in the vapors. Further, at high available oxygen contents in the liquid component, further decreases in yield of hydrogen peroxide are encountered due to the particular sensitiveness of the distillation liquid to catalysts brought in by electrolysis and accumulated in the liquid phase, and due to the increased instability of peroxide oxygen at elevated temperatures.

It is an object of the present invention to eliminate both disadvantages, namely the increased steam consumption and the extraordinary sensitiveness of the process towards catalysts.

In accordance with the procedures of the present invention the acid concentration permitting the optimal conversion and formation of peroxide oxygen in the evolved vapors is maintained in substantially all parts of the distilling tubes. In effecting this procedure, the solution to be distilled is added not only at the starting point of the distillation, as was done heretofore, but is added uniformly over all parts of the distilling system so that the acid concentration in the liquid phase of the mixture passing through the distilling tubes is kept substantially constant at the concentration where optimal conversion and yield of hydrogen peroxide is obtained. The optimal acid concentration has been found to be about 830–930 grams of sulfuric acid per liter, although good yields are obtained in the range 750–1050 grams per liter. Where a concentration in or near this range is maintained in substantially all parts of the distilling apparatus there is obtained, in spite of the low hydrogen peroxide concentration in the solution, a concentrated hydrogen peroxide as distillate. In accordance with the procedure of the present invention, about 88 to 90% of the available oxygen is obtained as hydrogen peroxide of high concentration as contrasted with the prior procedures where lesser yields or lower concentration are encountered.

In an actual plant operation where the acid concentration of sulfuric acid was maintained at or near 830–930 grams per liter in a distilling unit having a capacity of 320 liters of electrolyte solution per hour, 90% of the introduced electrolyte-oxygen was obtained as concentrated hydrogen peroxide without the necessity of subsequent addition of water to the distilled or distilling residue.

In the procedure of the present invention by adding electrolyte one increases the concentration of solids and therefore increases the concentration of available oxygen and of the hydrogen peroxide in the water vapors.

It will of course be understood that the electrolyte added to the acid distilling mixture containing the persulfate radical is also an acid solution containing the persulfate radical, as for instance, the solution obtained in an electrolyte cell by anodic oxidation of sulfuric acid or a salt thereof, as for instance, ammonium acid sulfate. The term "fresh electrolyte" as used in the claims, therefore, designates an acid solution containing the persulfate radical.

We claim:

1. The method of producing hydrogen peroxide in one stage from acid electrolyte solutions containing the persulfate radical which comprises passing the electrolyte through a heated distilling zone and adding fresh electrolyte to the distilling mixture at a plurality of points along the passage of the distilling liquid through the distilling zone whereby the concentration of acid in the distilling mixture is maintained substantially constant.

2. The method of producing hydrogen peroxide in one stage from an acid electrolyte solution containing the persulfate radical which comprises passing the electrolyte as a distilling mixture through a heated distilling zone and maintaining the concentration of acid in the distilling mixture substantially constant during its passage through the distilling zone by adding fresh electrolyte to the distilling solution along the passage thereof through the distilling zone.

3. The method of producing hydrogen peroxide in one stage from an acid electrolyte solution containing the persulfate radical which comprises passing the electrolyte through a heated distilling zone and maintaining the concentration of acid in the electrolyte substantially constant during its passage between the limits of about 750–1050 grams of sulfuric acid per liter by addition of fresh electrolyte to the distilling solution.

4. The method of producing hydrogen peroxide in one stage from acid electrolyte solutions containing the persulfate radical which comprises passing the electrolyte through a heated distilling zone and adding an amount of fresh electrolyte to the distilling mixture during the passage of the distilling liquid to maintain the concentration of acid in the mixture leaving the distilling zone substantially the same as that of the mixture in the distilling zone.

5. The method of producing hydrogen peroxide in one stage from acid electrolyte solutions containing the persulfate radical which comprises continuously passing the electrolyte through a heated distilling zone and adding fresh electrolyte to the distilling mixture during the passage of the distilling liquid through said zone in amounts sufficient to maintain the concentration of acid throughout the mixture within the range where optimum conversion to and yield of hydrogen peroxide occurs, that is, 750–1050 grams of sulphuric acid per liter.

GUSTAV ADOLPH.
MAX E. BRETSCHGER.